No. 688,025. Patented Dec. 3, 1901.
F. F. LOOMIS.
CONTROLLER FOR ELECTRIC AUTOMOBILES.
(Application filed May 24, 1900.)
(No Model.)
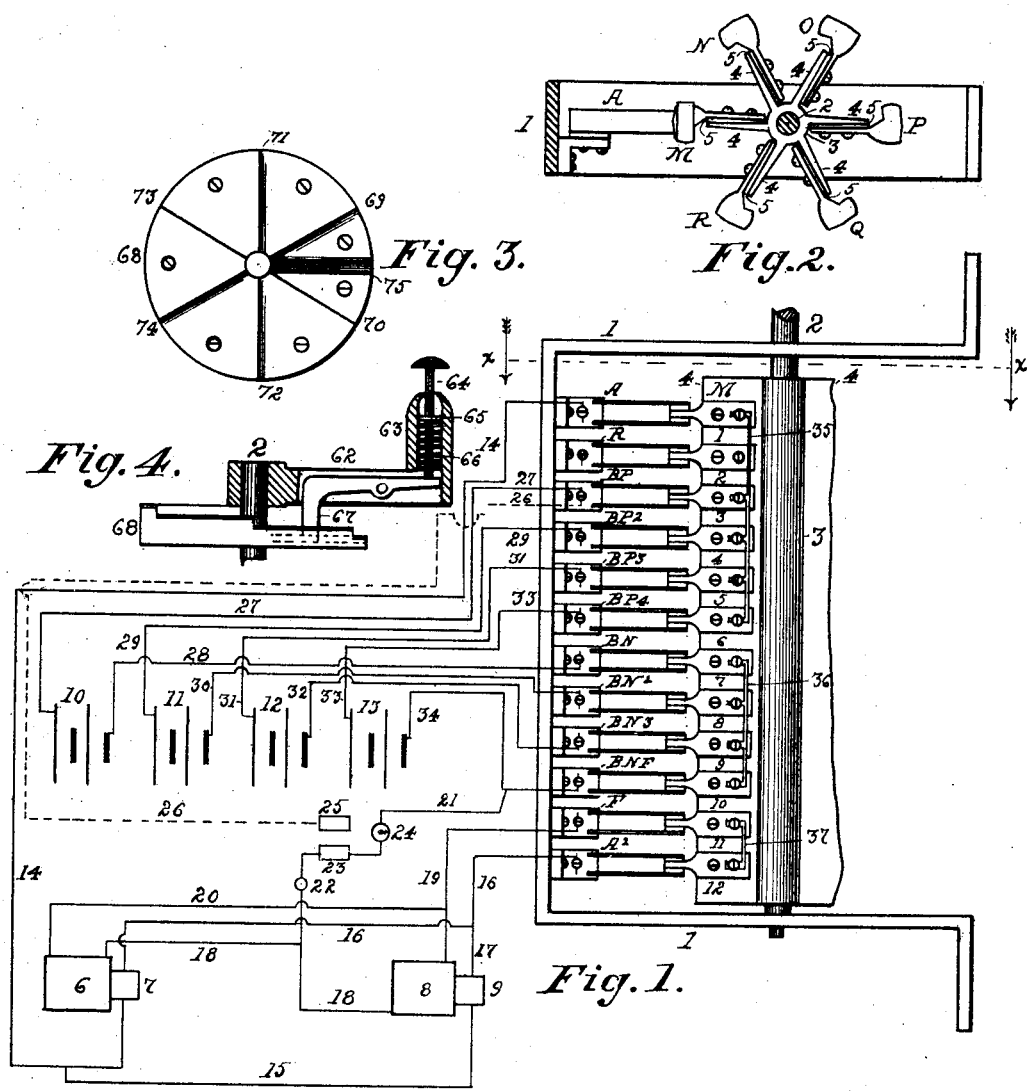
Witnesses:
G. B. Minard
Bessie Crook.
Inventor:
Frank F. Loomis,
By Humphrey & Humphrey
Attorneys.

UNITED STATES PATENT OFFICE.

FRANK F. LOOMIS, OF AKRON, OHIO.

CONTROLLER FOR ELECTRIC AUTOMOBILES.

SPECIFICATION forming part of Letters Patent No. 688,025, dated December 3, 1901.

Application filed May 24, 1900. Serial No. 17,845. (No model.)

*To all whom it may concern:*

Be it known that I, FRANK F. LOOMIS, a citizen of the United States, residing at Akron, in the county of Summit and State of Ohio, have invented a certain new and useful Improvement in Controllers for Electric Automobiles, of which the following is a specification.

My invention has relation to improvements in controllers for electric automobiles in which different degrees of electric current may be applied to the motors as the requirement of the machine may need and in which they may be graduated or cut at will.

Heretofore revoluble controllers have had spring-pressed fingers on the inclosing case rub on plates of metal on the revoluble cylinder, or vice versa, and the guide to the operator has been a pointer on the crank-handle and a graduated circle on the controller-head, thus trusting to the accuracy of the operator to make complete and perfect contacts, guided by observation alone. There are two objections to this construction: first, the contact is dependent entirely on the cleanness of the plates and the amount of surface in contact, and the second, arising from both these, is that where there is no positive stop for the movement of the controller-handle it is not accurately arrested when there is the most perfect and full contact, but may be stopped before or after such contact, thus making a narrow connection, the resistance of which tends to burn out the plates and prevent the efficiency of the apparatus.

The objects of my invention are to avoid these objections by using the knife-switch pattern to make the contacts, to provide a dial for the controller-handle with means for positively stopping at accurate points to make perfect contact, so that the efficiency of the machine will not depend on the eyesight only, and generally to provide compact, simple, and effective devices by which these changes may be quickly made to increase or diminish the power progressively either to move backward or forward, to cut the current entirely out, or to use the device in charging the batteries and to use the motors as a dynamo to act as a brake.

To the aforesaid objects my invention consists in the peculiar and novel construction, arrangement, and combination of parts hereinafter described and then specifically pointed out in the claims, reference being had to the accompanying drawings, forming a part of this specification.

In the accompanying drawings, in which similar reference numerals and characters indicate like parts in the different views, Figure 1 is a sectional elevation of a part of my machine with the batteries, motors, and wire connections in diagrammatic illustration and showing one set of switch-blades combined for a certain determinate result, hereinafter described; Fig. 2, a section of the controller at the line $x$ $x$ of Fig. 1 to more clearly illustrate its construction and mode of operation; Fig. 3, a plan of the controller-head, showing the limit and effect of the controller-handle; Fig. 4, a side elevation of the controller-head with the handle in longitudinal section.

Referring to the drawings, 1 is a frame or casing, preferably, for economy of floor-space and convenience of operation, standing vertically, in which is journaled a shaft 2, on which is mounted a sleeve 3, from which project at equidistant intervals six radial blades 4. On these blades are insularly mounted, by means of non-conducting plates 5, series of similarly-situated metallic plates terminating in wedge-shaped ends, with their edges in the direction of the rotation of the shaft 2 to form members of knife-switches. These series are for convenience marked with reference-letters, the series shown in Fig. 1 being M, those in Fig. 2 being M N O P Q R, and the separate plates with wedge-shaped ends numbered consecutively from 1 to 12, commencing at the top in Fig. 1.

Secured on the inside of the frame or casing 1 and in the planes of revolution of the wedge-shaped ends before referred to is a series of brackets, each having pairs of contact-plates adapted to be severally electrically connected with different parts of the electrical apparatus and consecutively marked from the top downward with the following letters and numerals, having the significance following, viz: A, armature; R, resistance; B P, battery positive pole; B P 2, battery positive pole 2; B P 3, battery positive pole 3; B P 4, battery positive pole 4; B N, battery negative pole; B N 2, battery negative pole 2; B N 3, battery negative pole 3; B N F, battery negative field; F, field; A 2, armature 2.

The electrical apparatus consists of field-magnets 6 and 8, armatures 7 and 9, and batteries 10, 11, 12, and 13, in which the light and heavy lines indicate, in the customary manner, the positive and negative poles, respectively.

The electrical connections are as follows: The wire 14 connects the plates A with the armature, and a branch wire 15 connects it with the armature 9. The wire 16 connects armature 7 with plate A 2, and a branch wire 17 connects armature 9 with wire 16. The wire 18 connects field-magnet 6 with field-magnet 8. The wire 19 connects field-magnet 8 with the plate F. The wire 20 connects the field-magnet 6 with the wire 19. The wire 21 connects the wire 18 with the plate B N F, and in this wire is placed a circuit-breaking key 22, one plate 23 of a charging-jack, and a voltmeter 24. The other plate 25 of the charging-jack is connected by a wire 26 to the plate B P. The plate B P is connected with the positive pole of battery 10 by the wire 27, and the negative pole of this battery is connected by the wire 28 with plate B N. The positive pole of battery 11 is connected by wire 29 with plates B P 2 and the negative pole by wire 30 with plates B N 2, the positive pole of battery 12 with plates B P 3 by wire 31 and the negative pole with plates B N 3 by wire 32, and the positive pole of battery 13 with plates B P 4 by wire 33 and the negative pole by wire 34 with wire 21.

The wedge-shaped ends of each series of the metallic plates on the radial blades 4, projecting from the sleeve 3, are arranged by a partial revolution of the shaft 2 to pass severally simultaneously between and make electrical connection with the series of pairs of fixed contact-plates hereinbefore described.

To secure different combinations of electrical energy to affect the motors, the members of each series of plates on the blades 4 are differently connected. To bring these several series in connection with the fixed plates, a crank-handle 62, mounted on the upper end of the shaft 2, is employed. This handle has a hollow grip 63, in which is a sliding pin 64, having a rounded head, and a disk 65, secured thereon, below which is a coiled spring 66, that constantly presses the pin upward. In the body of the handle is a recess in which is pivotally mounted a bent latch 67, arranged to be moved by the action of the pin 64 to raise the bent end when the pin is pressed down and fall as it is raised. Directly below this handle is a circular head 68, with its upper face divided by radial lines 69, 70, 71, 72, 73, and 74 into six equal parts. These parts lie in different planes, the portion between 69 70 being the lowest, the portions 69 71 and 70 72 being higher, the next 71 73 and 72 74 being still higher, and the highest being 73 74, these planes being divided by abrupt shoulders, and in the center of 69 70 is a radial groove 75. When the end of the latch 67 rests in the groove 75, there is no contact between the wedge-blades and the fixed plates, and hence there is no movement of the motors. The movement of the handle in either direction about the head will bring the various series of wedge-blades mounted to revolve with the shaft 2 into connection with the fixed plates A to A 2 at different points to produce the different results.

I claim as my invention—

In combination with a controller for automobiles, consisting of a revoluble shaft bearing a plurality of series of switch-blades, electrically connected to produce distinct combinations of connections between electrical apparatus and motors, and a plate with an opening for said shaft, having one face divided into sectional planes of different heights by radial lines, of a handle adapted to turn said shaft, provided with a latch to engage the terminals of each section, substantially as shown and described.

In testimony that I claim the above I hereunto set my hand in the presence of two subscribing witnesses.

FRANK F. LOOMIS.

In presence of—
  C. P. HUMPHREY,
  C. E. HUMPHREY.